(12) United States Patent
Douglas et al.

(10) Patent No.: US 8,355,027 B2
(45) Date of Patent: Jan. 15, 2013

(54) SYSTEM AND METHOD FOR PRESENTING VISUAL INFORMATION AT PLURAL DISPLAY DEVICES

(75) Inventors: David W. Douglas, Austin, TX (US); Jeffrey Thelen, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 1238 days.

(21) Appl. No.: 12/146,808

(22) Filed: Jun. 26, 2008

(65) Prior Publication Data

US 2009/0322767 A1 Dec. 31, 2009

(51) Int. Cl.
*G06F 15/00* (2006.01)
*G06T 1/00* (2006.01)
*G09G 5/00* (2006.01)

(52) U.S. Cl. .................................. 345/501; 345/1.1

(58) Field of Classification Search .............. 345/501
See application file for complete search history.

(56) References Cited

U.S. PATENT DOCUMENTS

| | | | |
|---|---|---|---|
| 6,195,086 B1 | 2/2001 | Perlman et al. | |
| 6,583,771 B1 | 6/2003 | Furuhashi et al. | |
| 6,816,129 B1 | 11/2004 | Zimmerman | |
| 2007/0097326 A1 | 5/2007 | Yang | |
| 2008/0273602 A1* | 11/2008 | Glen | 375/257 |
| 2008/0297520 A1* | 12/2008 | Montag | 345/501 |

* cited by examiner

*Primary Examiner* — Jacinta M Crawford
(74) *Attorney, Agent, or Firm* — Hamilton & Terrile, LLP; Robert W. Holland

(57) ABSTRACT

A dual transceiver architecture provides source and sink device capabilities for communicating visual information between information handling systems and displays. A detector determines whether a cable connected to a port provides visual information or receives digital information. If visual information is received at a port, the visual information is provided to an adjacent port through a dual transceiver architecture so that the visual information is available to forward to another display, information handling system or other device. A common connector configuration simplifies the connection of multiple displays or devices, such as in a daisy chain configuration.

20 Claims, 4 Drawing Sheets

SYSTEM AND METHOD FOR PRESENTING VISUAL INFORMATION AT PLURAL DISPLAY DEVICES

BACKGROUND OF THE INVENTION

1. Field of the Invention

The present invention relates in general to the field of information handling system display peripherals, and more particularly to a system and method for presenting visual information at plural display devices.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often run applications having a primary goal of presenting information to an end user as visual images. Typically, applications running on a central processing unit (CPU) generate visual information in a compressed or only partly-processed format. The visual information is forwarded from the CPU to a graphics processing unit (GPU) that is typically supported on a daughter card generally known as a graphics card. The GPU completes the processing of the visual information to a format that is used by a display to present the visual information as visual images. Early information handling systems presented visual images by generating analog television signals that were output by analog televisions. Eventually, in order to provide greater resolution of the visual images at the display, analog signal standards were developed to communicate visual image pixel information from the information handling system to the display, such as the CGA, EGA, VGA and SVGA standards. As digital processing components became more powerful, industry developed standards for providing visual information in digital formats, such as the DVI and more recently the DisplayPort standards. With digital formats, a graphics card on the information handling system outputs pixel information in digital form, which a processor on the display uses to define the color output at each pixel.

Generally, in order to communicate information to a display device, an information handling system graphics card couples to the display device with a cable or, in the case of portable systems having an integrated display, a bus/serial link. Information handling systems sometimes support remote presentation of visual information by communication of the visual information through a network interface, although the visual information is typically too large to communicate except in compressed form. DisplayPort does support some limited ability to communicate uncompressed visual information since the DisplayPort pixel information is communicated in packets. Under the DisplayPort standard, the information handling system graphics card acts as a source device that transmits visual information packets and the display device acts as a sink device that receives the visual information packets. The source device is designated as an output device that drives, amplifies and encodes the visual information for streaming to the sink device. The sink device decodes the visual information and generates visual images by applying the visual information to pixels of the display device. Generally, in order to provide visual information to plural displays, a source device couples to each device, such as a graphics card in an information handling system or, in some instances, a dedicated repeater-type of device that re-drives, amplifies and encodes or trans-codes visual information. Current architectures require significant external components having substantial costs to distribute visual information content over long distances. Such architectures typically are confusing and difficult to set up.

SUMMARY OF THE INVENTION

Therefore a need has arisen for a system and method which interfaces display devices with each other using interchangeable connections.

In accordance with the present invention, a system and method are provided which substantially reduce the disadvantages and problems associated with previous methods and systems for interfacing display devices with each other. A multiple transceiver architecture communicates visual information between source and sink devices so that adjacent ports selectively accept and forward visual information between source and sink devices.

More specifically, a multiple transceiver architecture selectively receives and forwards visual information for presentation at a display. In one embodiment, each transceiver has a DisplayPort receiver, a DisplayPort transmitter and a port having a common physical connector so that a cable that provides or accepts visual information can interface with each port interchangeably. Each receiver interfaces with the transmitter of the adjacent transceiver through a crossover circuit so that information received at a first port is automatically transmitted from the adjacent port. A detector determines whether a port accepts inbound visual information to automatically cross over the visual information to the adjacent port. Presentation of visual information at a particular display is managed by control information in the DisplayPort packets or through auxiliary channels available at each port. A plurality of displays may be daisy chained together by running cables between the dual transceiver architectures. Alternatively, multiple source devices may interface with a common display for selective presentation of visual information from each source device. Visual information received at a first port from a first source device may be repeated through the adjacent port to another source device, such as for storage of the visual information at the other source device.

The present invention provides a number of important technical advantages. One example of an important technical advantage is that a display connection accepts visual information for presentation at a display and provides the information to other displays in a daisychain configuration. An interchangeable connector of a display both receives and transmits visual information as either a sink or source DisplayPort device. A transceiver architecture automatically detects whether a source or sink is connected. If a sink is connected, visual information is presented at the display and re-driven at an adjacent connector for use by other display devices. End users are able to quickly interface multiple display devices in a daisychain configuration with a common connector in a simple and non-confusing manner.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A multiple transceiver architecture for communicating visual information simplifies connections of a display with an information handling system or with other displays. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
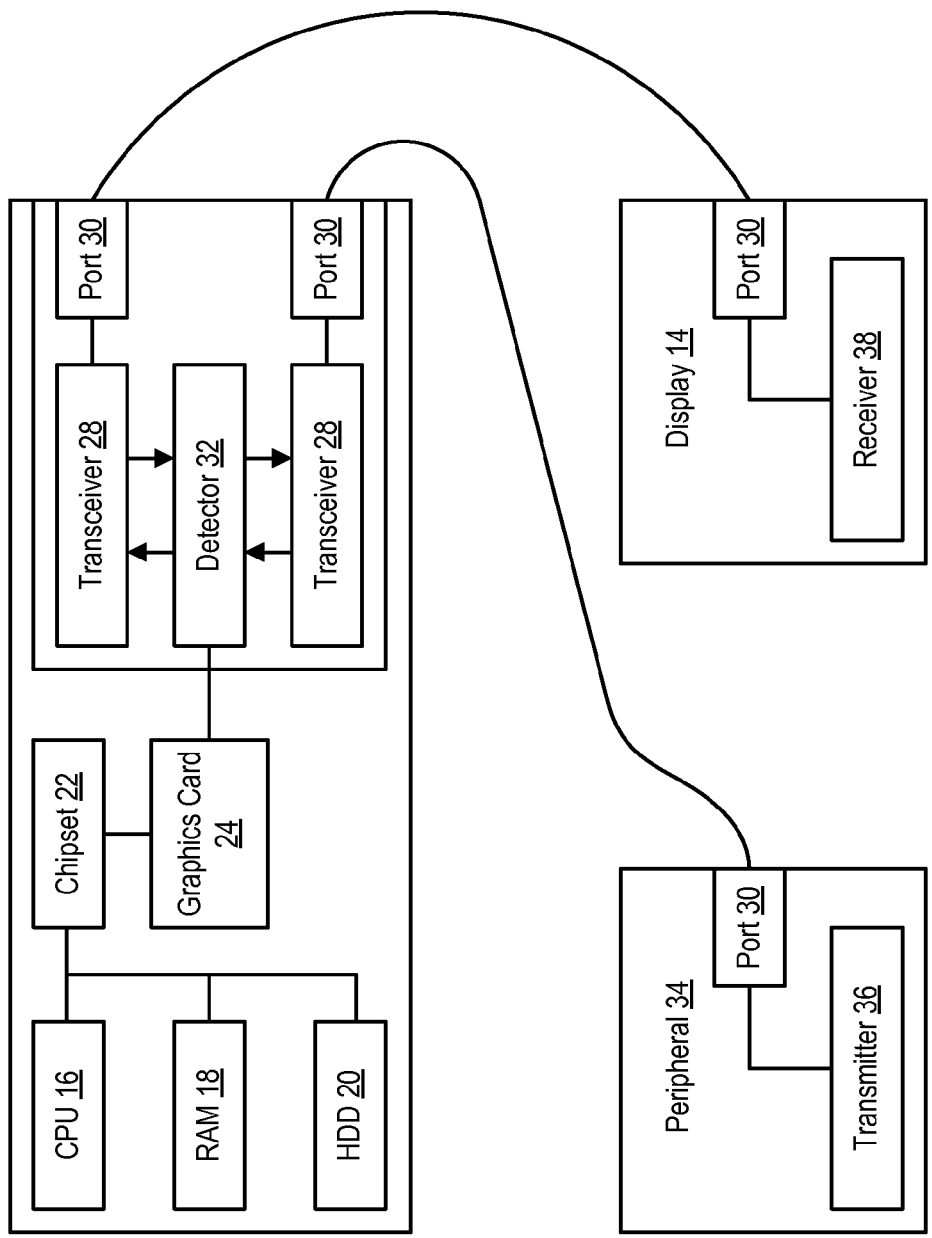
FIG. 1 depicts a block diagram of an information handling system having a dual transceiver architecture.

Referring now to FIG. 1, a block diagram depicts an information handling system 10 having a dual transceiver architecture 12. Although this example embodiment depicts a dual transceiver architecture, the multiple transceiver architecture can have more than two transceivers in alternative embodiments. Information handling system 10 has a plurality of processing components that cooperate to process information, such as by running an application that generates visual information for presentation at a display 14. For instance, a CPU 16 processes information stored in RAM 18 and a hard disk drive 20 as coordinated by a chipset 22. A graphics card 24 has a graphics processing unit that accepts visual information and formats the visual information for presentation at a display, such as by defining values for the display of pixels at display 14 so that a visual image is created according the visual information. Dual transceiver architecture 12 accepts visual information from graphics card 24 and transmits the visual information through a cable 26, such as in accordance with the DisplayPort standard. The DisplayPort standard defines a packet that transmits visual information through a serial link and has a bi-directional auxiliary channel that communicates control information with a display 12 or other peripheral or information handling system.

The dual transceiver architecture 12 has first and second transceivers 28 that communicate through first and second ports 30. Each transceiver 28 has a receiver and a transmitter so that it can both receive and transmit information through each respective port 30. Ports 30 have common connector configurations to accept both a receiving end and a transmitting end of a cable 26. A detector 32 interfaced with the transceivers 28 determine whether a cable 26 at a port 30 is providing visual information from an external location or is accepting visual information for communication to an external device. If a port 30 accepts visual information from an external location, detector 32 commands transceiver 28 associated with that port 30 to receive the information and to provide the visual information to the other transceiver 28 for transmission from the other port 30. In other words, detector 32 automatically determines whether a port is to act as a source device or a sink device. As an example, in the embodiment depicted by FIG. 1, a peripheral 34 having a DisplayPort port 30 and transmitter 36 provides visual information to information handling system 10 which is retransmitted through detector 32 and the first and second transceivers 28 to a port 30 and receiver 38 of display 14 so that visual information from peripheral 34 is presented at display 14. Detector 32 may also provide the visual information received from peripheral 34 to graphics card 24 for use by the processing components, such as by recording the visual information received from peripheral 34 to hard disk drive 20. For example, if peripheral 34 is a video camera, the images taken by the camera are presented by display 14 and saved to information handling system 10. Alternatively, an application running on CPU 16 or firmware instructions running on chipset 22, graphics card 24 and/or detector 32 allows an end user to select visual information for presentation at display 14, such as a selection between visual information generated at peripheral 34 or graphics card 24. Presentation of desired information at a specified device is also controlled through the DisplayPort auxiliary channel and with management information provided in the header of the DisplayPort packets.

Figure 2:
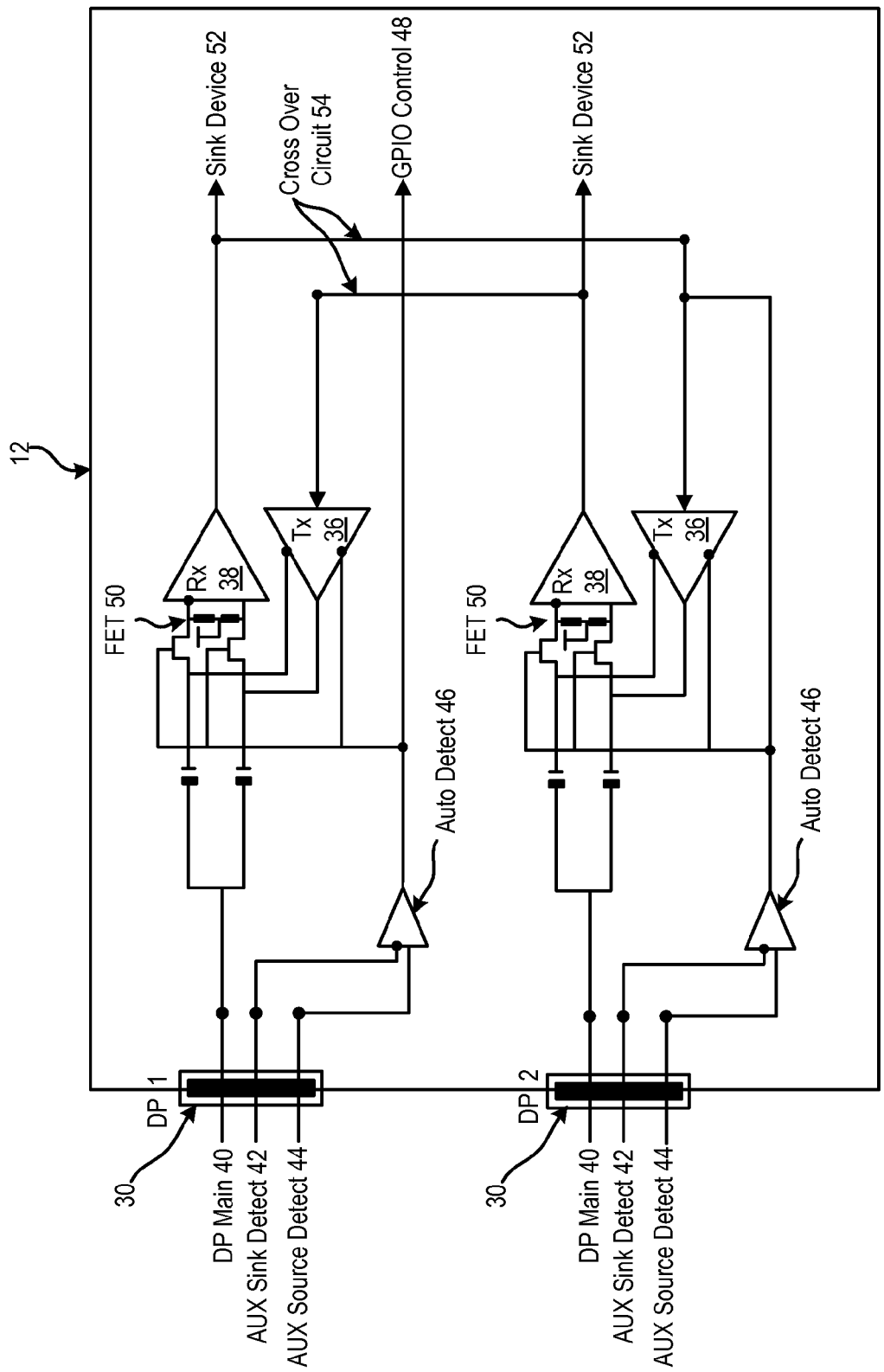
FIG. 2 depicts a circuit diagram of the dual transceiver architecture.

Referring now to FIG. 2, a circuit diagram depicts a dual transceiver architecture 12. In alternative embodiments, additional transceivers can be added to the circuit. A first port 30 labeled DP1 couples to a first DisplayPort cable and a second port 30 labeled DP2 couples to a second DisplayPort cable. Each port 30 accepts a main DisplayPort link 40 that carries visual information as well as an auxiliary sink detect 42 and auxiliary source detect 44 to communicate bi-direction auxiliary DisplayPort information. An auto detect circuit 46 interfaced with the auxiliary sink and source detect links 42 and 44 determines whether a sink device or source device interfaces at port 30 and issues an appropriate command to a GPIO control line 48, which provides the status of each port 30 to processing components within an information handling system or display. If an auto detect circuit 46 detects a sink device, information received at the port 30 associated with the auto detect circuit 46 is provided to a receiver 38 by an FET 50 for output to a sink device through sink output 52. In addition to providing output at sink device 52, the received information is communicated through a cross over circuit 54 to a transmitter 36 of an adjacent port 30. An FET 50 of the adjacent port 30 directs information from the transmitter 36 out the main link 40 of the adjacent port 30. For example, an inbound signal at DP1 is provided to the receiver 38 of DP1 and the transmitter 36 of DP2 so that the signal received at DP1 is output at DP2.

Figure 3:
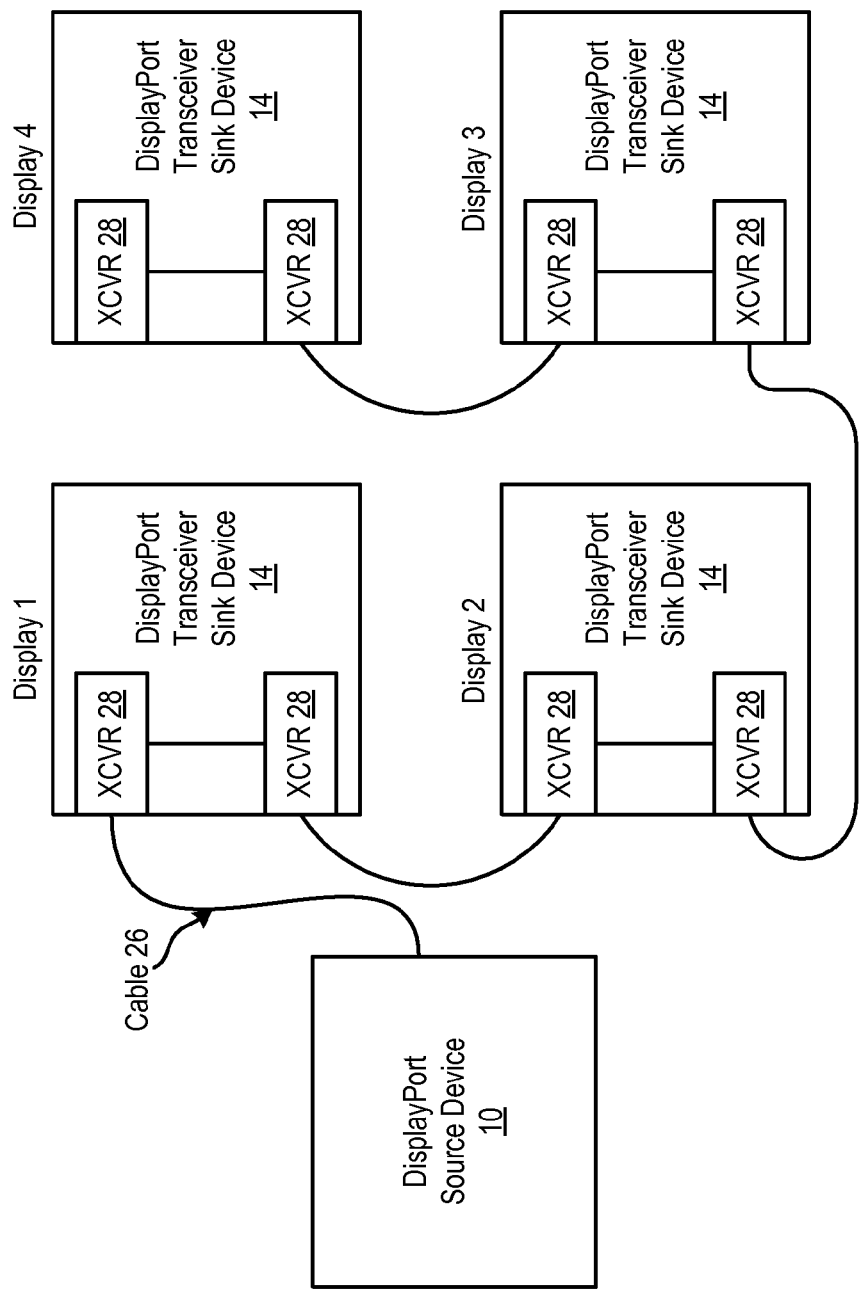
FIG. 3 depicts a block diagram of plural displays arranged in a daisy chain configuration.

Referring now to FIG. 3, a block diagram depicts plural displays 14 arranged in a daisy chain configuration. A DisplayPort source device 10, such as an information handling system provides visual information in a DisplayPort format, such as with packets sent through a serial link, to a first display 14 through a cable 26. A transceiver 28 receives the visual information for presentation at the display 14 and forwards the received visual information to an adjacent transceiver 28, which transmits the visual information through a cable 26 to another display 14. Each display 14 having a pair of adjacent transceivers is able to receive and then retransmit the visual information in a daisy chain configuration. With each port having a common connector configuration, a cable 26 interfaces with any port in an interchangeable manner so that setup of a display to receive, present and retransmit information is simplified.

Figure 4:
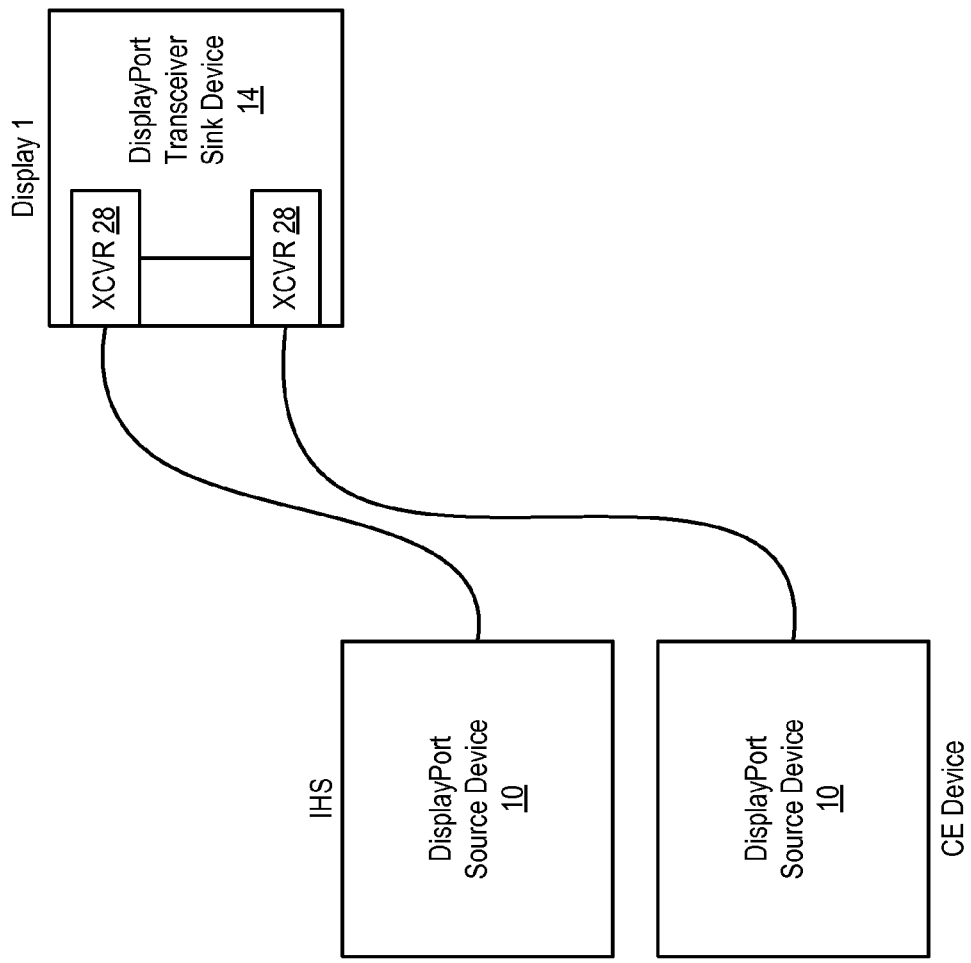
FIG. 4 depicts a block diagram of a display having a dual transceiver interfaced with multiple source devices.

Referring now to FIG. 4, a block diagram depicts a display 14 having a dual transceiver 28 that is interfaced with multiple source devices 10. For example, an information handling system 10 and a miniaturized information handling system 10, such as a handheld device that uses WINDOWS CE or a similar operating system, each interface with a display 14 so that either source device 10 may present visual information at display 14. For example, a driver within each information handling system 10 allows an end user to specify the source for presentation of visual images at display 14. Control information sent through an auxiliary channel or with visual information packets directs the operation of transceivers 28. For example, a transceiver 28 can receive information from an adjacent transceiver and send that information to another source device 10. Alternatively, each transceiver can receive visual information for presentation at designated portions of display 14, such as within separate windows.

Although the present invention has been described in detail, it should be understood that various changes, substitutions and alterations can be made hereto without departing from the spirit and scope of the invention as defined by the appended claims.

What is claimed is:

1. An information handling system comprising:
   plural processing components operable to process information and to generate visual information;
   a graphics processor interfaced with the processing components and operable to output the visual information in a display format;
   a transceiver interfaced with the graphics processor, the transceiver operable to transmit the visual information in the display format at a port, the transceiver further operable to accept inbound visual information in the display format at the port for communication to the graphics processor; and
   a detector associated with the transceiver and operable to detect the inbound visual information to command the transceiver to receive the inbound visual information.

2. The information handling system of claim 1 wherein the display format comprises a DisplayPort format.

3. The information handling system of claim 1 wherein the graphics processor is further operable to accept the inbound visual information for use by the processing components.

4. The information handling system of claim 1 further comprising a secondary, transceiver having a secondary port, the secondary transceiver interfaced with the transceiver to accept inbound visual information from the transceiver and to transmit the inbound visual information from the secondary port.

5. A display comprising:
   a display panel operable to present visual information as visual images;
   first and second ports, each port operable to couple to a display cable, the display cable operable to communicate the visual information;
   a first transceiver coupled to the first port and operable to transmit or receive the visual information; and
   a second transceiver coupled to the second port and operable to transmit or receive the visual information, the second transceiver interfaced with the first transceiver so that the second transceiver transmits visual information from the second port that is received at the first port.

6. The display of claim 5 wherein the first and second transceivers communicate the visual information through a serial link.

7. The display of claim 6 wherein the serial link comprises a DisplayPort compliant link.

8. The display of claim 5 further comprising a detector operable to detect inbound visual information at the first port and to output a signal to the second transceiver to output the inbound visual information from the second port.

9. The display of claim 5 wherein the first transceiver interfaces with the second transceiver so that the first transceiver transmits visual information from the first port that is received at the second port.

10. The display of claim 9 wherein the first and second ports comprise a common connector configuration.

11. A method for managing visual information at a display, the method comprising:
   accepting visual information at a first port of the display, the first port having a first transceiver;
   communicating the visual information to a second transceiver of the display; and
   transmitting the visual information from a second port associated with the second transceiver.

12. The method of claim 11 further comprising:
   communicating the visual information from the first transceiver to a display panel; and
   presenting the visual information with the display panel.

13. The method of claim 11 wherein accepting visual information further comprises accepting packets having the visual information through a serial link.

14. The method of claim 13 wherein the serial link comprises a DisplayPort link.

15. The method of claim 11 further comprising:
   interfacing a second display with a cable through the second port; and
   presenting the visual information at the second display.

16. A system for interfacing plural display devices, the system comprising:
   a first transceiver having a first port, first receiver and first transmitter; and
   a second transceiver having a second port, second receiver and second transmitter;
   wherein the first receiver interfaces with the second transmitter to repeat signals received at the first port as output from the second port; and
   wherein the second receiver interfaces with the first transmitter to repeat signals received at the second port as output from the first port.

17. The system of claim 16 wherein the first and second ports have a common connector configuration.

18. The system of claim 16 wherein the signals comprise visual information formatted as packets.

19. The system of claim 16 further comprising a detector interfaced with the first and second receivers to detect inbound signals for coordinating output from the first and second transmitters.

20. The system of claim 16 wherein the signals comprise DisplayPort formatted signals.

* * * * *